United States Patent
Shimizu

[11] 3,736,049
[45] May 29, 1973

[54] WIDE ANGLE PHOTOGRAPHING LENS

[75] Inventor: Yoshiyuki Shimizu, Kawasaki-shi, Kanagawa-ken, Japan

[73] Assignee: Nippon Kogaku K.K., Tokyo, Japan

[22] Filed: Sept. 29, 1971

[21] Appl. No.: 184,883

[30] Foreign Application Priority Data

Sept. 30, 1970 Japan ..................... 45/85417

[52] U.S. Cl. .......................... 350/214, 350/212
[51] Int. Cl. ............................ G02b 9/64
[58] Field of Search ........................ 350/214

[56] References Cited

UNITED STATES PATENTS 3,512,874  5/1970  Woltche ................ 350/214

FOREIGN PATENTS OR APPLICATIONS 1,250,153  9/1967  Germany ............... 350/214

*Primary Examiner*—John K. Corbin
*Attorney*—Joseph M. Fitzpatrick, John Thomas Cella, Charles B. Cannon

[57] ABSTRACT

A wide angle photographing lens which has a brightness of F2, an angle of field greater than 74° and a long back focus of 1.2 times as great as the focal length, and which comprises a combination of a forward lens group which is an afocal reversed Galilean conversion, and a rearward lens group which is a master lens. The forward lens group comprises a negative meniscus lens convex to the object side, a positive lens, a negative meniscus lens convex to the object side, a positive lens and a negative lens cemented thereto. The rearward lens group comprises a biconvex lens, a biconcave lens, a positive meniscus lens concave to the object side, and a positive lens. All of these lenses are sequentially arranged in the named order in the direction away from the object so as to satisfy predetermined conditions. The spacing between the forward and rearward lens groups is variable.

1 Claim, 7 Drawing Figures

— SPHERICAL ABERRATION
--- SINE CONDITION
(PHOTOGRAPHING DISTANCE ∞)

--- MERIDIONAL
— SAGITTAL

DISTORTION (CLOSE-UP $\beta = -1/10$)

WIDE ANGLE PHOTOGRAPHING LENS

BACKGROUND OF THE INVENTION

1. Field of the Invention

This invention relates to a wide angle photographing lens having a large relative aperture.

2. Description of the Prior Art

Wide angle lenses for single lens reflex cameras which have an angle of field greater than 70° have conventionally adopted the back-telephoto type construction because they must have a large back focus of 1.2 times, or more, their focal length. However, most of such lenses generally have a brightness of the order of F3.5, and at best of the order of F2.8. This is because, in a back-telephoto type lens, the negative refractive power of the foremost lens group has such a large absolute value that it is difficult to correct the negative distortional aberration, spherical aberration and especially coma which result from such a great negative refractive power.

SUMMARY OF THE INVENTION

The present invention has, for an object, the provision of a wide angle photographing lens which has a long back focus, a brightness of F2.0 and an angle of field greater than 74° and in which various aberrations can be well corrected.

Briefly, the wide angle photographing lens of the present invention comprises a first negative meniscus lens convex to the object side of the system, a second positive lens, a third negative meniscus lens convex to the object side, a fourth positive lens, a fifth negative lens cemented to said fourth positive lens, a sixth biconvex lens, a seventh biconvex lens, an eighth positive meniscus lens concave to the object side, and a ninth positive lens. These lenses are sequentially arranged in the named order in the direction away from the object. The first to fifth lenses together constitute a forward lens group and the sixth to ninth lenses together constitute a rearward lens group. The lens system satisfies predetermined conditions, and the spacing between the forward and rearward lens groups is variable.

The invention will become fully apparent from the following detailed description of an embodiment thereof taken in conjunction with the accompanying drawings.

DESCRIPTION OF THE PREFERRED EMBODIMENT

Figure 1:
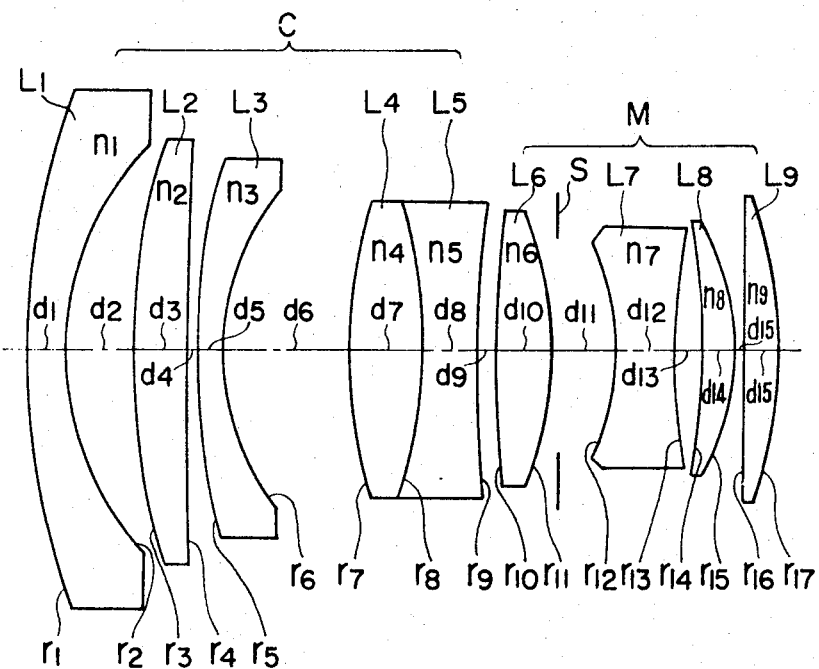
FIG. 1 is a sectional view of an embodiment of the present invention.

Referring to FIG. 1, the wide angle lens system of the present invention comprises a series of components arranged sequentially in the direction away from the object. They include a negative meniscus lens L1 with its convex surface facing the object, a positive lens L2, a negative meniscus lens L3 with its convex surface facing the object, a biconvex lens L4, a negative lens L5 cemented to the biconvex lens L4, a biconvex lens L6, a stop S, a biconcave lens L7, a positive meniscus lens L8 with its concave surface facing the object, and a positive lens L9. As viewed in the direction of travel of light, the radii of curvature of the successive lenses are represented by $r_1, r_2 \ldots r_{17}$, the thicknesses or air gaps of the lenses by $d_1, d_2 \ldots d_{16}$, and the refractive indices of glasses forming the respective lenses by $n_1, n_2 \ldots n_9$. The lenses from the negative meniscus lens L1 to the negative lens L5 together constitute a forward lens group C, and the lenses from the biconvex lens L6 to the positive lens L9 together constitute a rearward lens group M. The lens system is arranged so as to satisfy the following conditions:

$$|fc| > 3f \qquad (1)$$

$$\left. \begin{array}{c} (1/5f) > (n_5 - n_4/r_8) > (1/10f) \\ n_4 - n_5 > 0.1 \end{array} \right\} \qquad (2)$$

$$r_{10} > |-r_{11}| \qquad (3)$$

$$0.55f < |-r_{12}| < 0.73f \qquad (4)$$

$$0.25f < d_{12} + d_{13} + d_{14} < 0.45f \qquad (5)$$

where $fc$ represents the combined focal length of the forward lens group C and $f$ the focal lengths of the entire lens system.

Condition (1) means that the absolute value of the combined focal length $fc$ of the lens group constituted by the negative meniscus lens L1 to the negative lens L5 is greater than the value of the overall focal length $f$ and that this portion of the lens system is substantially an afocal reversed Galilean conversion. Thus, the negative meniscus lens L1 to the negative lens L5 constitute a afocal reversed Galilean conversion C, while the biconvex lens L6 to the positive meniscus lens L9 constitute a master lens M having a positive refractive power. The present invention thus comprises a combination of a afocal reversed Galilean conversion C and a master lens M. Generally, the afocal reversed Galilean system tends to provide negative distortion, inner coma, overcorrected spherical aberration, and a small angle of field relative to the master lens, which would result in a small curvature of the image field.

According to the present invention, the correction of spherical aberration and distortional aberration is particularly effected in the afocal reversed Galilean conversion C. The use of two separate negative lenses such as the negative meniscus lenses L1 and L3 is directed to divide the share of refractive power in addition, thereby reducing the spherical aberration and coma, and the positive lens L2 interposed therebetween serves to correct the negative distortional aberration.

Condition (2) will now be considered, which reads:

$$1/5f > (n_5 - n_4/r_8) > 1/10f$$

$$n_4 - n_5 > 0.1$$

This condition is provided to correct the spherical aberration. More specifically, it means that the radius of curvature $r_8$ provides for a refractive power considerably greater than expected for the interface between two lenses and is effective for the correction of a high degree of spherical aberration which must of course be taken into consideration in an optical system having a brightness amounting to F2. According to this condition, a high degree of spherical aberration will occur in the negative sense if the refractive power of the lens exceeds its upper limit, and it will be curved in the positive sense if the lower limit of the refractive power is passed. The magnification of the afocal reversed Galilean conversion C is approximately 0.7 and this serves to reduce the angle of incidence on the master lens M and maintain a good final image field.

As for condition (3), which reads:

$$r_{10} > |-r_{11}|,$$

this condition is meant to correct the inner coma. This condition renders the refractive power in the surface of the biconvex lens L6 facing the object lower than that in the other surface of that lens. As is well known, the shape of this lens is adapted to curve the spherical aberration in the negative sense when an object point further away from the lens is to be focused closer to the lens. Such a lens shape tends to provide a positive sine condition and produce an outer coma, thereby negating the inner coma produced by the afocal reversed Galilean conversion C.

Condition (4) serves to change a convergent light beam passed through the biconvex lens L6, which has a large negative spherical aberration, into a divergent light beam and, thereby, correct the spherical aberration in a positive sense while greatly increasing the back focus. That is, the condition (4), i.e.

$$0.55f < |-r_{12}| < 0.73f,$$

indicates that the surface of the biconcave lens L7 looking toward the object has a greater absolute value of negative refractive power. Thus, this condition is useful to correct the negative spherical aberration produced by the biconvex lens L6. If the lower limit of condition (4) is passed, the spherical aberration will be over-corrected, and if the upper limit is exceeded, the spherical aberration will not only be undercorrected but also a long back focus could not be attained. However, condition (4) does not suffice to increase the back focus to a necessary value, and for this purpose, condition (5) must be satisfied, which reads:

$0.25f < d_{12} + d_{13} + d_{14} < 0.45f$ This condition specifies the inter-vertex spacing between the surface of the biconcave lens L7 looking toward the object and the surface of the positive lens L8 looking toward the object. There is no positive refractive power acting between these surfaces, and therefore a greater value of $d_{12} + d_{13} + d_{14}$ may result in a longer back focus. In other words, unless the lower limit of condition (5) is reached, a necessary long back focus cannot be obtained, and if the upper limit is exceeded, the back focus will become too long and the image field will tend to curve in the positive sense.

When all of the foregoing conditions are satisfied, there can be provided a wide angle lens which has a brightness of F2, an angle of field greater than 74° and a long back focus of 1.2 times as great as the focal length.

Generally, in the back-telephoto type lenses, a smaller photographing distance or a closer shot tends to cause the image field to curve in the positive sense and the degree of such curvature is greater as the relative aperture and the angle of field are greater. Therefore, in a wide angle lens having a large relative aperture, such as the lens of the present invention, the close-up distance must usually be limited to the order of $20f$. Such a situation is reflected in the fact that a wide angle lens whose angle of field is of the order of 60° usually has a shorter close-up distance than a wide angle lens whose angle of field is of the order of 74°, although the former has a longer focal length and a greater relative aperture than the latter. According to the present invention, the combination of a substantially afocal afocal reversed Galilean conversion C and a master lens M is successful in enabling the spacing $d_9$ therebetween to be variable in accordance with the photographing distance so as to virtually negate the curvature of image field in the positive sense. The variations in spherical aberration and distortion which may occur in that case are negligible because they are corrected by the substantially afocal afocal reversed Galilean conversion C itself.

In said wide angle photographing lens having a large relative aperture, as shown in FIG. 1, various elements are selected as follows: angle of field 74.5° and focal length $f$=100.0mm.

| | | |
|---|---|---|
| $r_1 = +227.238$ | $d_1=11.189$  $n_1=1.62299$ | $Vd_1=58.1$ |
| $r_2 = +76.224$ | $d_2=22.727$ | |
| $r_3 = +237.762$ | $d_3=16.434$  $n_2=1.744$ | $Vd_2=44.9$ |
| $r_4 = +5956.748$ | $d_4=0.350$ | |
| $r_5 = +213.252$ | $d_5=6.993$  $n_3=1.62299$ | $Vd_3=58.1$ |
| $r_6 = +63.986$ | $d_6=38.461$ | |
| $r_7 = +117.098$ | $d_7=23.427$  $n_4=1.7725$ | $Vd_4=49.5$ |
| $r_8 = -134.266$ | $d_8=15.743$  $n_5=1.51680$ | $Vd_5=64.2$ |
| $r_9 = +321.241$ | $d_9=5.245$ | |
| $r_{10} = +297.203$ | $d_{10}=17.483$  $n_6=1.51680$ | $Vd_6=64.2$ |
| $r_{11} = -106.388$ | $d_{11}=20.280$ | |
| $r_{12} = -67.133$ | $d_{12}=18.881$  $n_7=1.78470$ | $Vd_7=26.1$ |
| $r_{13} = +253.497$ | $d_{13}=4.895$ | |
| $r_{14} = -244.755$ | $d_{14}=11.888$  $n_8=1.74443$ | $Vd_8=47.9$ |
| $r_{15} = -76.923$ | $d_{15}=0.350$ | |
| $r_{16} = +875.524$ | $d_{16}=12.238$  $n_9=1.713$ | $Vd_9=53.9$ |
| $r_{17} = -127.295$ | | |
| $fc = 1406.3$ | $B.F. = 136.1$ | |

In this table, $r$ represents the radii of curvature of the successive lens surfaces, $d$ the lens thicknesses or spacings, $n$ the refractive indices of the glasses forming the lenses with respect to the yellow helium-d line of the spectrum, and $Vd$ Abbe numbers of the glasses.

Figure 2A:
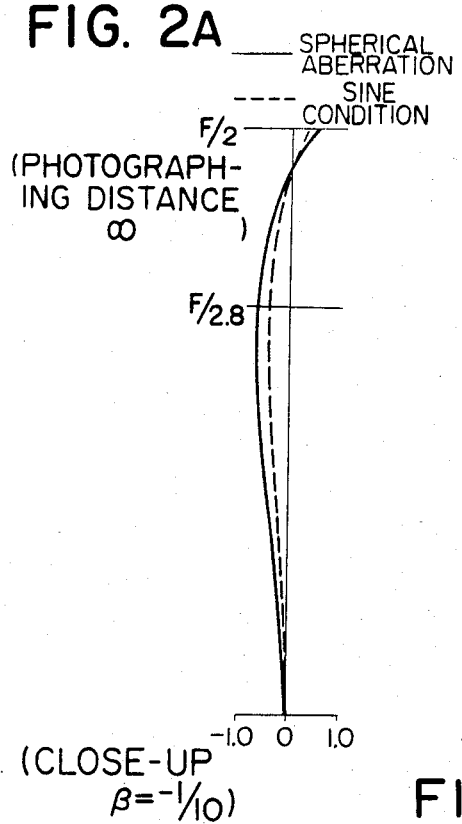
FIG. 2 FIGS 2(A) to 2(E) graphically illustrates various aberrations in that embodiment, namely, spherical aberration FIG. 2(A), astigmatism FIG. 2(B), distortional aberration FIG. 2(C), and spherical aberration, astigmatism and distortional aberration FIG. 2(D), FIG. 2(E) and FIG. 2(F) for a close-up shot at a magnification 1/10.
Figure 2B:
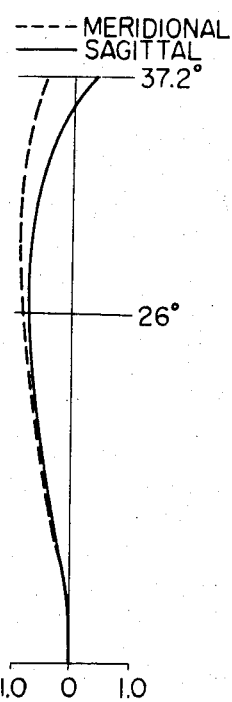
Figure 2C:
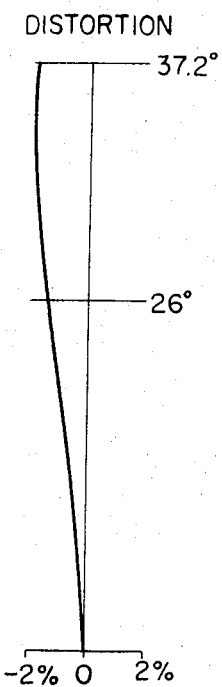
Figure 2D:
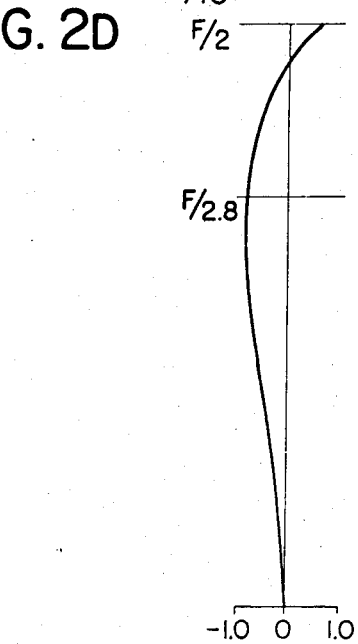
Figure 2E:
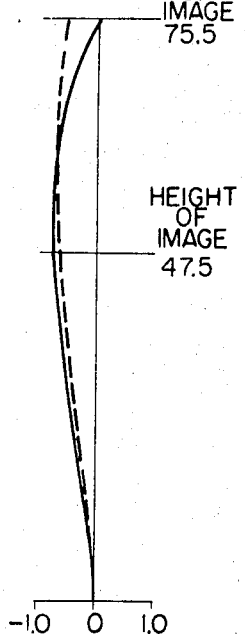
Figure 2F:
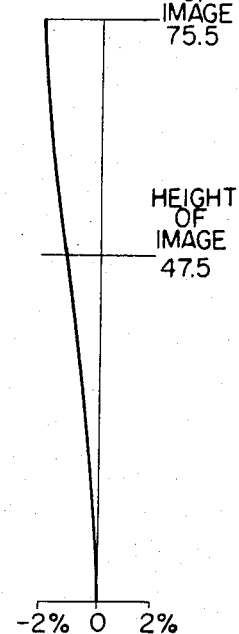

The aberrations in the lens system are graphically illustrated in FIGS. 2(A) to 2(F), where FIGS. 2(A), 2(B) and 2(C), respectively, show the spherical aberration, astigmatism and distortional aberration for the infinite photographing distance, and FIGS. 2(D), 2(E) and 2(F), respectively, show the spherical aberration, astigmatism and distortional aberration for a close-up shot at a magnification $\beta=-1/10$. In the case of a close-up shot at a magnification of the order of 1/10, a good correction is maintained without causing any appreciable difference as compared with the case of photographing at infinity. In this instance, the amount of variation in the inter-lens spacing $d_9$ is $-2.2$mm for $f=100$mm.

The Seidel aberration factors of the respective refractive surfaces in the illustrated embodiment are shown in the table below, where I, II, III, IV and V represent spherical aberration, coma, curvature of meriodional plane, curvature of sagittal plane, and distortional aberration, respectively.

| Lens No. | I | II | III | IV | V |
|---|---|---|---|---|---|
| 1 | 0.020 | 0.029 | 0.295 | 0.211 | 0.304 |
| 2 | −2.042 | 0.403 | −0.742 | −0.583 | 0.115 |
| 3 | 0.505 | 0.186 | 0.385 | 0.248 | 0.091 |
| 4 | −0.007 | −0.026 | −0.296 | −0.103 | −0.379 |
| 5 | 0.144 | 0.110 | 0.435 | 0.265 | 0.204 |
| 6 | −8.111 | 0.822 | −0.850 | −0.683 | 0.069 |
| 7 | 7.005 | 0.723 | 0.596 | 0.447 | 0.046 |
| 8 | 0.718 | −0.348 | 0.576 | 0.239 | −0.116 |
| 9 | −0.013 | −0.022 | −0.220 | −0.144 | −0.250 |
| 10 | 0.0170 | 0.027 | 0.247 | 0.159 | 0.255 |
| 11 | 6.568 | −2.078 | 2.292 | 0.978 | −0.309 |
| 12 | −10.598 | 1.993 | −1.779 | −1.030 | 0.194 |
| 13 | −1.334 | −1.082 | −2.806 | −1.051 | −0.852 |
| 14 | 0.035 | 0.111 | 0.895 | 0.182 | 0.583 |
| 15 | 2.643 | −0.352 | 0.695 | 0.602 | −0.080 |
| 16 | −0.00001 | −0.0007 | −0.079 | 0.005 | 0.336 |
| 17 | 5.258 | −0.366 | 0.403 | 0.352 | −0.025 |
| Σ | 0.809 | 0.131 | 0.047 | 0.093 | 0.187 |

It will thus be seen that the present invention does indeed provide an improved wide angle photographing lens which is superior in quality as compared to prior art such systems.

Although certain particular embodiments of the invention are herein disclosed for purposes of explanation, various modifications thereof, after study of this specification, will be apparent to those skilled in the art to which the invention pertains.

I claim:

1. A wide angle photographing lens system having a large relative aperture, consisting of a first negative meniscus lens convex to the object side of the system, a second positive lens, a third negative meniscus lens convex to the object side, a fourth positive lens, a fifth negative lens cemented to said fourth positive lens, a sixth biconvex lens, a seventh biconcave lens, an eighth positive meniscus lens concave to the object side, and a ninth positive lens, said lenses being sequentially arranged in the named order in the direction away from the object, said first to fifth lenses together constituting a forward lens group and said sixth to ninth lenses together constituting a rearward lens group, said system satisfying the following conditions:

$$|fc| > 3f$$
$$1/5f > (n_5 - n_4/r_8) > 1/10f$$
$$n_4 - n_5 > 0.1$$
$$r_{10} > |-r_{11}|$$
$$0.55f < |-r_{12}| < 0.73f$$
$$0.25f < d_{12} + d_{13} + d_{14} < 0.45f$$

where $r$ subscripts represent the radii of curvature of the successive lens surfaces; $d$ subscripts the lens thicknesses or spacings between lenses, $n$ subscripts the refractive indices of the lens glasses, $fc$ the focal length of said forward lens group, and $f$ the focal length of the entire system, the spacing $d_9$ between said forward and rearward lens groups being variable.

* * * * *